United States Patent [19]

Masog et al.

[11] 4,093,983
[45] June 6, 1978

[54] FAST AND NORMAL RATE INSTRUCTION FETCHING

[75] Inventors: Charles Raymond Masog; Jerome Urban Petrie, both of Rochester, Minn.; Yasutsugu Mishima, Pickering, Canada

[73] Assignee: International Business Machines Corporation, Armonk, N.Y.

[21] Appl. No.: 696,446

[22] Filed: Jun. 15, 1976

[51] Int. Cl.[2] .............................................. G06F 9/06
[52] U.S. Cl. ................................................... 364/200
[58] Field of Search .......................... 340/172.5; 445/1

[56] References Cited

U.S. PATENT DOCUMENTS

| | | | |
|---|---|---|---|
| 3,408,630 | 10/1968 | Packard et al. | 340/172.5 |
| 3,657,705 | 4/1972 | Mekota, Jr. et al. | 340/172.5 |
| 3,990,052 | 11/1976 | Gruner | 364/200 |

Primary Examiner—Harvey E. Springborn
Attorney, Agent, or Firm—Donald F. Voss

[57] ABSTRACT

Instruction processing rate in a computer system is increased by providing a high speed data path to central processing unit (CPU) registers and including an auxiliary arithmetic and logic unit to enable updating the instruction address register (IAR) in one operation concurrently with a storage fetch whereby two storage fetches can be made within a single machine cycle. Normal instruction rate processing is retained by generating idle or dummy half cycles to enable a single storage fetch per machine cycle and thereby maintain flexibility for I/O instruction processing, for diagnostic purposes and for fetching the last byte or segment of an instruction having an odd number of bytes or segments.

11 Claims, 21 Drawing Figures

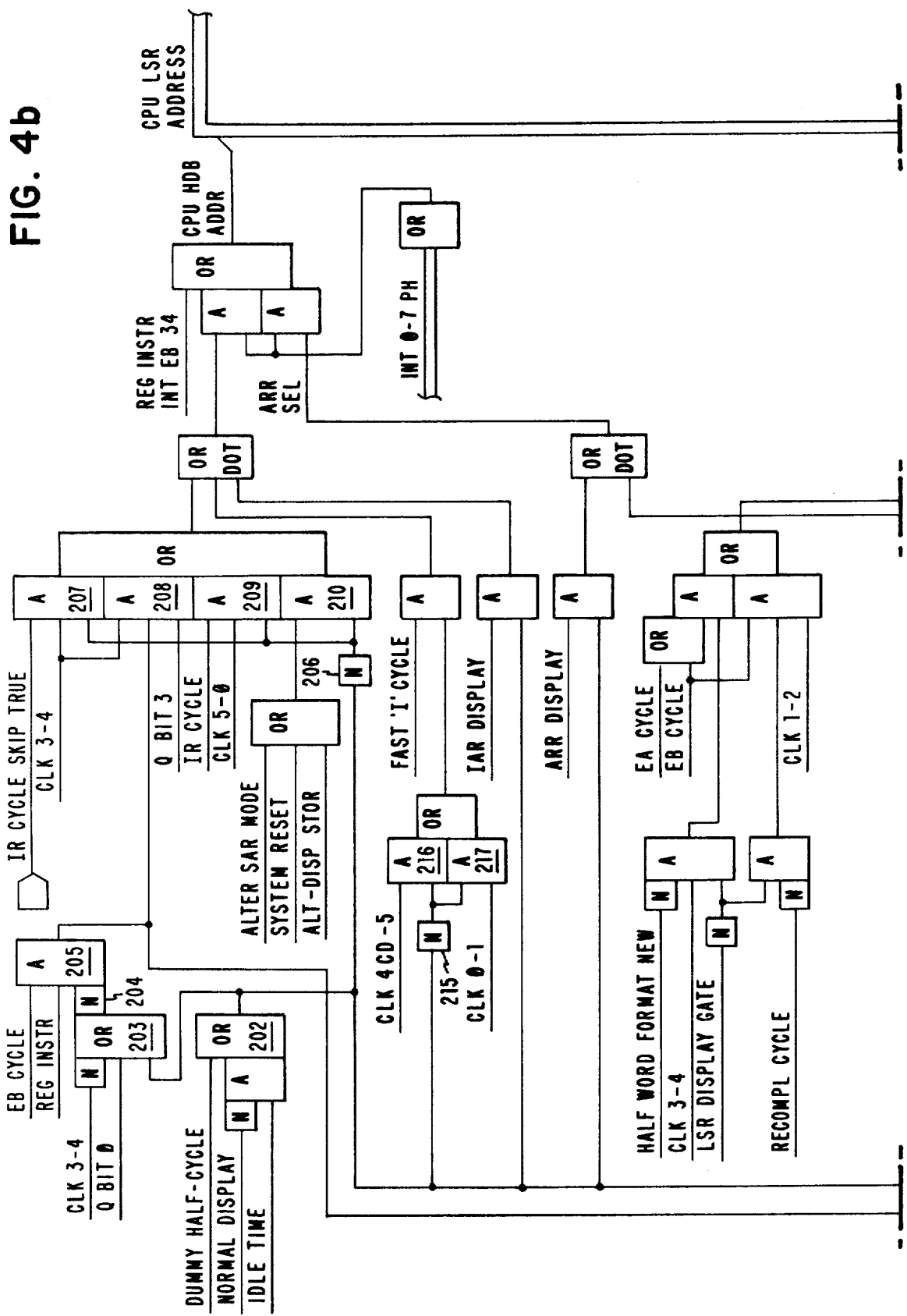

TWO ADDRESS INSTRUCTION – OPERAND 1 ADDRESS DIRECT

| OP CODE<br>0001<br>0010 | Q BYTE | OPERAND 1<br>(HIGH ORDER ADDRESS BYTE) | OPERAND 1<br>(LOW ORDER ADDRESS BYTE) | OPERAND 2<br>DISPLACEMENT |
|---|---|---|---|---|

0 BITS 3

TWO ADDRESS INSTRUCTION – OPERAND 2 ADDRESS DIRECT

| OP CODE<br>0100<br>1000 | Q BYTE | OPERAND 1<br>DISPLACEMENT | OPERAND 2<br>(HIGH ORDER ADDRESS BYTE) | OPERAND 2<br>(LOW ORDER ADDRESS BYTE) |
|---|---|---|---|---|

0 BITS 3

TWO ADDRESS INSTRUCTION – BOTH ADDRESSES DIRECT

| OP CODE<br>0000 | Q BYTE | OPERAND 1<br>(HIGH ORDER ADDRESS BYTE) | OPERAND 1<br>(LOW ORDER ADDRESS BYTE) | OPERAND 2<br>(HIGH ORDER ADDRESS BYTE) | OPERAND 2<br>(LOW ORDER ADDRESS BYTE) |
|---|---|---|---|---|---|

0 BITS 3

COMMAND INSTRUCTION

| OP CODE<br>1111 | Q BYTE | COMMAND |
|---|---|---|

ONE ADDRESS INSTRUCTION – BASE-DISPLACEMENT ADDRESSING

| OP CODE<br>1110<br>1101<br>1011<br>0111 | Q BYTE | DISPLACEMENT OPERAND |
|---|---|---|

0 BITS 3

ONE ADDRESS INSTRUCTION – DIRECT ADDRESSING

| OP CODE<br>0011<br>1100 | Q BYTE | (HIGH ORDER BYTE OF ADDRESS) OPERAND | (LOW ORDER BYTE OF ADDRESS) OPERAND |
|---|---|---|---|

0 BITS 3

TWO ADDRESS INSTRUCTION – BOTH ADDRESSES BASE-DISPLACEMENT

| OP CODE<br>0101<br>0110<br>1001<br>1010 | Q BYTE | OPERAND 1<br>DISPLACEMENT | OPERAND 2<br>DISPLACEMENT |
|---|---|---|---|

0 BITS 3

FIG. 6

FAST AND NORMAL RATE INSTRUCTION FETCHING

BACKGROUND OF THE INVENTION

1. Field of the Invention

This invention relates to computer systems and more particularly to instruction handling circuitry in computer systems.

The invention finds particular utility in computer systems where instructions are fetched a byte at a time and bytes are fetched successively to completely fetch an instruction. In such computer systems it has been the practice to fetch one instruction byte per machine cycle. This was accomplished by accessing storage during a first portion and updating the storage address during a second portion of the machine cycle. The instruction byte or segment retrieved from storage is entered into a selected register of the CPU. For example, the first byte of an instruction which is fetched is usually the operation code (OP code) byte and it is entered into the operation register. The IAR is updated and then the next byte of the instruction is fetched and placed into another register. The process continues until all bytes of the instruction are fetched and placed into appropriate registers in the CPU. This process is called the I phase or I fetch. The instruction is then executed according to the operation specified by the OP code. The execution of an instruction is the E phase.

2. Description of the Prior Art

The prior art techniques for speeding up the instruction processing rate include pre-fetching instructions so as to overlap instruction fetch and instruction execution phases. Another technique is to fetch more bytes of the instruction at any one time. These prior art techniques are effective but are relatively more expensive. This is because they require many parallel paths or wider paths for data as well as attendant control circuitry. In the present invention there is one additional data path, one additional register, and an auxiliary ALU together appropriate controls; however, the data paths, except for the paths from the additional register and auxiliary ALU, are one byte or segment wide. The present invention fetches only one byte or segment of the instruction at a time; however, because of the additional data path from storage; i.e., one that bypasses the register which feeds the regular ALU, it is possible to enter the fetched byte in the destination register, such as the OP register, faster. The auxiliary ALU can update the IAR in one operation and hence the IAR can be updated earlier witin a machine cycle. This only involves using an earlier clock signal for clocking the IAR. With the IAR updated earlier it is possible to initiate and complete a second storage access within the same machine cycle. Since the bytes are still fetched successively, the data path to the destination registers did not have to be widened.

SUMMARY OF THE INVENTION

The principal objects of the invention are to provide improved instruction fetching apparatus which:
  a. increases the instruction fetch rate in a computer system where bytes or segments of an instruction are fetched successively one byte or segment at a time;
  b. can be incorporated into an existing computer system and still permit normal instruction rate processing; and
  c. is relatively inexpensive.

The foregoing objects are achieved by shortening the data path timewise from data storage to the destination registers and by updating the instruction address register in one operation and earlier in the machine cycle. Normal rate instruction processing is preserved by generating an idle or dummy half cycle during which time the CPU is idle, i.e., no storage fetches, no IAR updates, etc. take place.

BRIEF DESCRIPTION OF THE DRAWINGS

FIG. 6 is a schematic diagram illustrating instruction formats of the different types of instructions;

DESCRIPTION OF THE INVENTION

Figure 1:
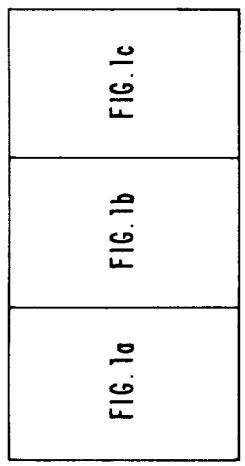
FIG. 1 is a block diagram illustrating the arrangement of FIGS. 1a, 1b and 1c which taken together are a schematic diagram of the data flow in a computer system incorporating the present invention.
Figure 2:
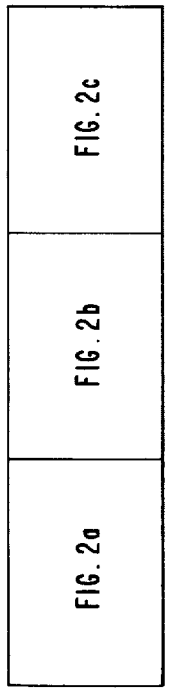
FIG. 2 is a block diagram illustrating the arrangement of FIGS. 2a, 2b, and 2c which taken together are a schematic logic diagram of logic circuitry for developing control signals for fast and normal instruction rate processing.

With reference to the drawings and particularly to FIG. 1, the invention is shown by way of example as being incorporated into a computer system of the type shown and described in U.S. Pat. No. 3,828,327, dated Aug. 6, 1974 for Simplified Storage Protection and Address Translation Under System Mode Control In A Data Processing System by Berglund et al. and in the IBM 5415 Processing Unit Theory — Maintenance — Diagrams manual (Form No. SY31-0367-2), copyrighted 1974 by International Business Machines Corporation which are incorporated herein by reference. The invention enhances data processing of the type described in the aforementioned references by increasing the instruction rate. While this may be considered a performance enhancement, it is also a functional enhancement in that the multiprogramming capabilities of the system can be expanded without performance degradation. In other words, the invention makes it feasible to expand the functional programming capabilities of the system.

Main storage unit 10, FIG. 1, stores both instructions and data in the form of bytes, each byte consisting of 8 bits of data. The instructions are stored in storage 10 at addressable byte locations according to a program, whereby the instructions will be fetched and executed in a predetermined sequence to perform a particular job or operation. Basically, an instruction must be fetched and then executed. The number of machine cycles required to fetch an instruction and execute it depends upon the type of instruction.

The present invention is particularly concerned with the fetching of instructions rather than the execution of them. The different types of instructions which are used in the referenced computer system are shown in FIG. 6. In this particular example each instruction has an operation code (OP code) byte and a Q code byte. In addition to these bytes there are either address bytes or a control byte within an instruction. The address bytes are for addressing storage to fetch data or operands to be used in the execution phase of the instruction. The control byte is used for command purposes such as halt program level, advance program level, jump on condition or start I/O. The instructions vary in length from 3 to 6 bytes depending upon the type of instruction.

The four high order bits of the OP code byte are encoded to identify to the central processing unit (CPU) the format of the instruction and the type of addressing which is to take place, i.e., direct or indexed. Instructions having one address, i.e., 2 bytes for an address to fetch one operand from storage, have OP codes with either bits 0 and 1 both or bits 2 and 3 both ones. Instructions containing two storage addresses have OP codes where one of the bits 0 and 1 is a zero or one of the bits 2 and 3 is a zero. Instructions having OP codes where bits 0, 1, 2 and 3 are all ones are command instructions. Command instructions do not contain addresses for addressing storage 10.

The meaning of the Q byte of an instruction depends upon the type of instruction. For instructions having one address, the Q byte can be immediate data, a bit selection mask, a register selection address, a branch condition, or an I/O device address and data selection. The Q byte of instructions containing two addresses can be a field length indicator or half byte selector. The Q byte of command instructions can be a halt identifier (tens digit), an advance program level condition, a jump condition, or an I/O device address.

The computer system in this example has a fixed machine cycle of 1.52u seconds. This machine cycle is formed by a group of clock times 0-8 generated by clock 11, FIG. 1. Clock times 0 and 1 are each 200 nano (n) seconds (s) and the remaining clock times 2-8 are each 160ns. Each clock time is subdivided into phase times, each phase being 40ns. Hence, clock times 0 and 1 have phases A, B, C, D and E and clock times 2-8 have phases A, B, C and D. Details of clock 11 are shown on page 2-1 of manual SY31-0367-2.

In the past each I cycle was one machine cycle long. Each machine cycle was divided into five functional time periods. Clock 0 was used to address storage. The storage address contained in the local storage registers (LSR's) 100, i.e., in the instruction address register (IAR) was transferred to storage address register (SAR) 20. The second functional time was clock 1 and 2 times and was a miscellaneous time for processing data through the arithmetic and logic unit (ALU) 50 during the delay or the time it takes for the addressed data to emerge from storage 10.

The next functional period was the compute time consisting of clocks 3 and 4. Compute time was for combining the data from storage 10 and entered into B register 25 with the contents of A register 30 by means of ALU 50. The results at the ALU output were available for transfer into storage.

The fourth and fifth functional times were used for address modification, i.e., the low byte of the selected LSR was updated (modified) and then the high byte was updated.

In the present invention the machine cycle has remained fixed and the functional times have been changed. The clock and phase times also remain the same. During the first part of a machine cycle, clock times 0 and 1, FIGS. 1 and 8. IAR in LSR's 100 is selected and the storage address in the IAR is transferred via HI and LO buses 105 and 110 into SAR 20. The address in SAR 20 addresses storage via main storage address register 21. The two registers 20 and 21 exist because of address translation capability which is not pertinent to the present invention, but is described in the aforementioned U.S. Pat. No. 3,828,327. A memory or storage cycle takes place from clock time 1 phase B through clock time 3 phase A. The byte of data fetched from storage 10 is entered into fetch data register 12 and becomes available to bus 14 via error correcting code circuitry 13. The OP code byte addressed transfers from storage over bus 14 to an auxiliary ALU 60 and from ALU 60 via gate 80 and bus 85 into OP register 90 during clock 3 time.

The address in the IAR is updated during the memory cycle. The contents of the IAR are loaded into an auxiliary B register 26 during phases D and E of clock 0 time. The path from the IAR into the auxiliary B register is via buses 105 and 110. The contents of the auxiliary B register 26 are entered into the auxiliary ALU 60 via bus 27 which is 16 bits wide. Auxiliary ALU 60 increments the address from register 26 and the incremented address is returned to the IAR during phase D of clock 1 time. Note that the incrementing operation of the IAR does not conflict with the data taken from storage and passed through the auxiliary ALU 60 because data is not available at the storage output until the end of phase A of clock 3 time.

Although other activities take place during the I-OP cycle, i.e., the contents of condition register 115 are stored in the program status register which is one of the LSR registers 100, the I-OP cycle is completed at the end of phase B of clock 4 time. The I-OP cycle is the same for any type of instruction.

Figure 8:
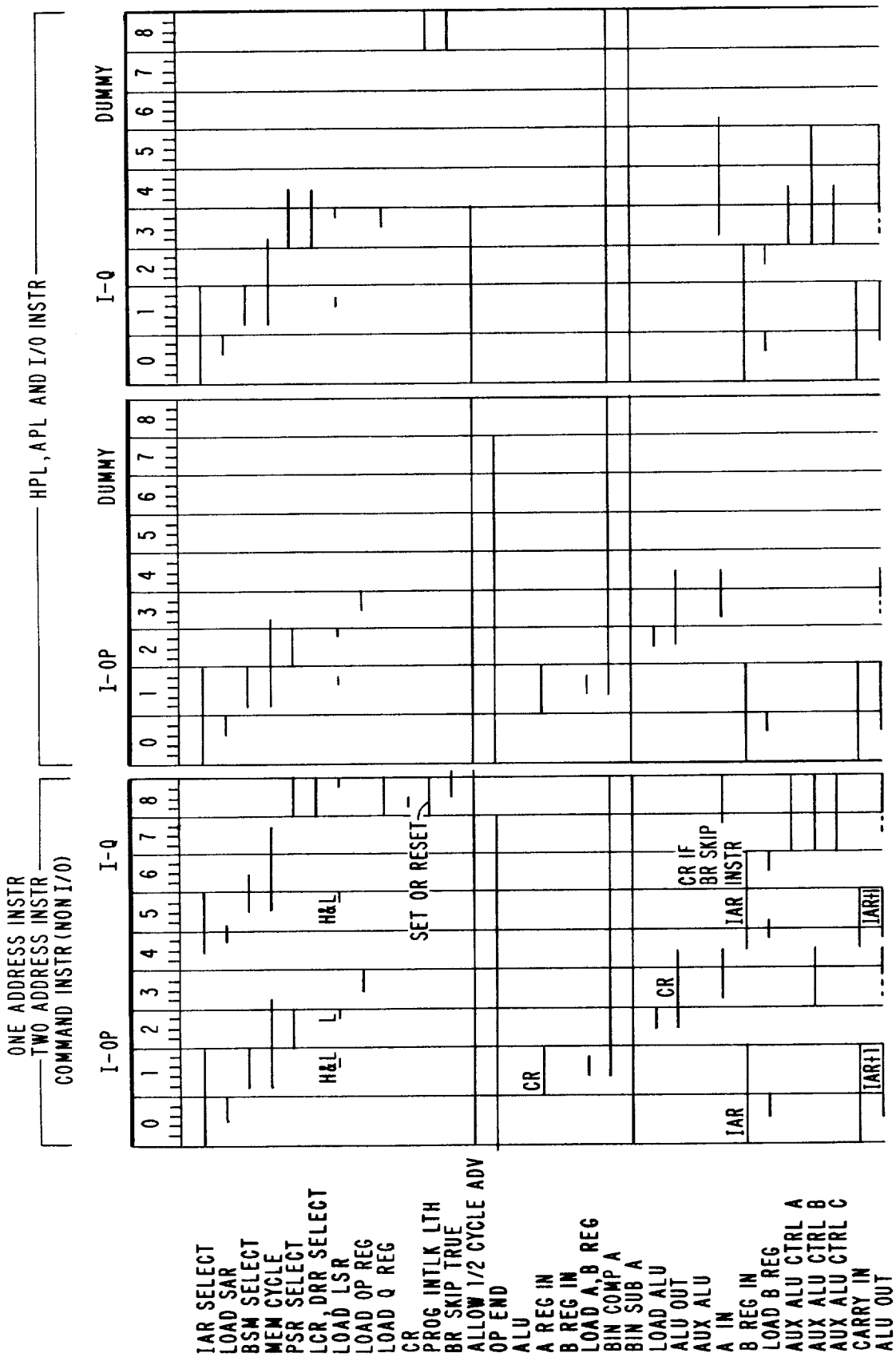
FIG. 8 is a timing diagram illustrating the I-OP and I-Q cycles of different types of instructions.

The next I cycle within the machine cycle is dependent upon the particular type of instruction. If the instruction is one containing one address, two addresses, or a command instruction, then the next I cycle is an I-Q cycle. If the instruction is a halt program level, an advance program level, or an I/O instruction, the next I cycle is a dummy I cycle. This is illustrated in FIG. 8 which shows an I-OP cycle followed by an I-Q cycle for the one address, two address and non I/O command instructions and an I-OP cycle followed by a dummy I cycle for halt program level, advance program level and I/O instructions. A dummy I cycle, of course, is a dummy or idle machine half cycle.

Assuming that the OP code defines an instruction having one address, two addresses, or a command then the I-Q cycle immediately follows the I-OP cycle and starts at clock 4 time, phase C. The IAR is selected in the same manner as it is for the I-OP cycle. SAR is loaded with the contents of the IAR starting at phase D of clock 4 time. The memory or storage cycle begins at phase C of clock 5 time. The Q byte retrieved from storage is entered into Q register 95 during clock 8 time.

The Q byte in storage 10 passes into the fetch data register 12 and from there to bus 14 via the error correcting code circuitry 13. The Q byte then enters the auxiliary ALU 60 and passes through it to Q register 95 via gate 80 and bus 85.

The address in the IAR is updated during the I-Q cycle by transferring the address into the auxiliary B register 26 during phases D and A of clock 4 and 5 times respectively. The address is then transferred into the auxiliary ALU 60 via bus 27 and incremented by 1 and returned to the IAR via gate 80. The I-Q cycle terminates at the end of clock 8 time. It is thus seen that an I-OP cycle and an I-Q cycle are completed within a single machine cycle where heretofore the I-OP cycle took one machine cycle and the I-Q cycle took another machine cycle.

If the instruction being fetched is a halt program level, an advance program level or an I/O instruction as determined by decoding the OP code byte, then a dummy I cycle is taken. This is because the circuitry related to these instructions can not take advantage of the accelerated I fetch time without a major modification. Therefore, for compatability purposes the I-Q cycle does not start at phase C of clock time 4 but instead a dummy I cycle is taken and during the dummy I cycle, no activity takes place within the CPU or storage. The dummy I cycle terminates at clock 8 time and the I-Q cycle starts at the following clock 0 time.

The dummy I cycle or dummy machine half cycle occurs under control of cycle control circuitry 120. The details of cycle control circuitry 120 which are pertinent to the present invention are shown in FIGS. 2a and 2b. The dummy half cycle signal is present when trigger 132 is in the set state. The data input of trigger 132 is connected to the output of OR circuit 130 and its clock signal is connected to the output of AND circuit 131. The AC reset input of trigger 132 is connected to inverter 133 and the DC reset input is connected to the output of OR circuit 134. AND circuit 131 receives a fast I cycle signal, a clock 4 time signal, and a phase B signal. The fast I cycle signal comes from OR circuit 136 which receives the I-OP, the I-Q, the I-H1, the I-L1, the I-H2, the I-L2, the I-X1 and the I-X2 signals. Thus, a dummy half cycle can take place during any of the I fetch times corresponding to the inputs into OR circuit 136 and at clock 4, phase B time. Whether or not a dummy half cycle will occur, of course, depends upon whether OR circuit 130 is providing a signal to the data input of trigger 132.

OR circuit 130 receives the output of OR circuit 128. The inputs into OR circuit 128 are signals indicative of a Start I/O instruction, a Load I/O instruction, a Sense instruction, a Halt Program Level instruction, and a Test I/O or Advance Program Level instruction. The origin of these signals is set forth in manual SY31-0367-2 at page 2-27 thereof.

Figure 9:
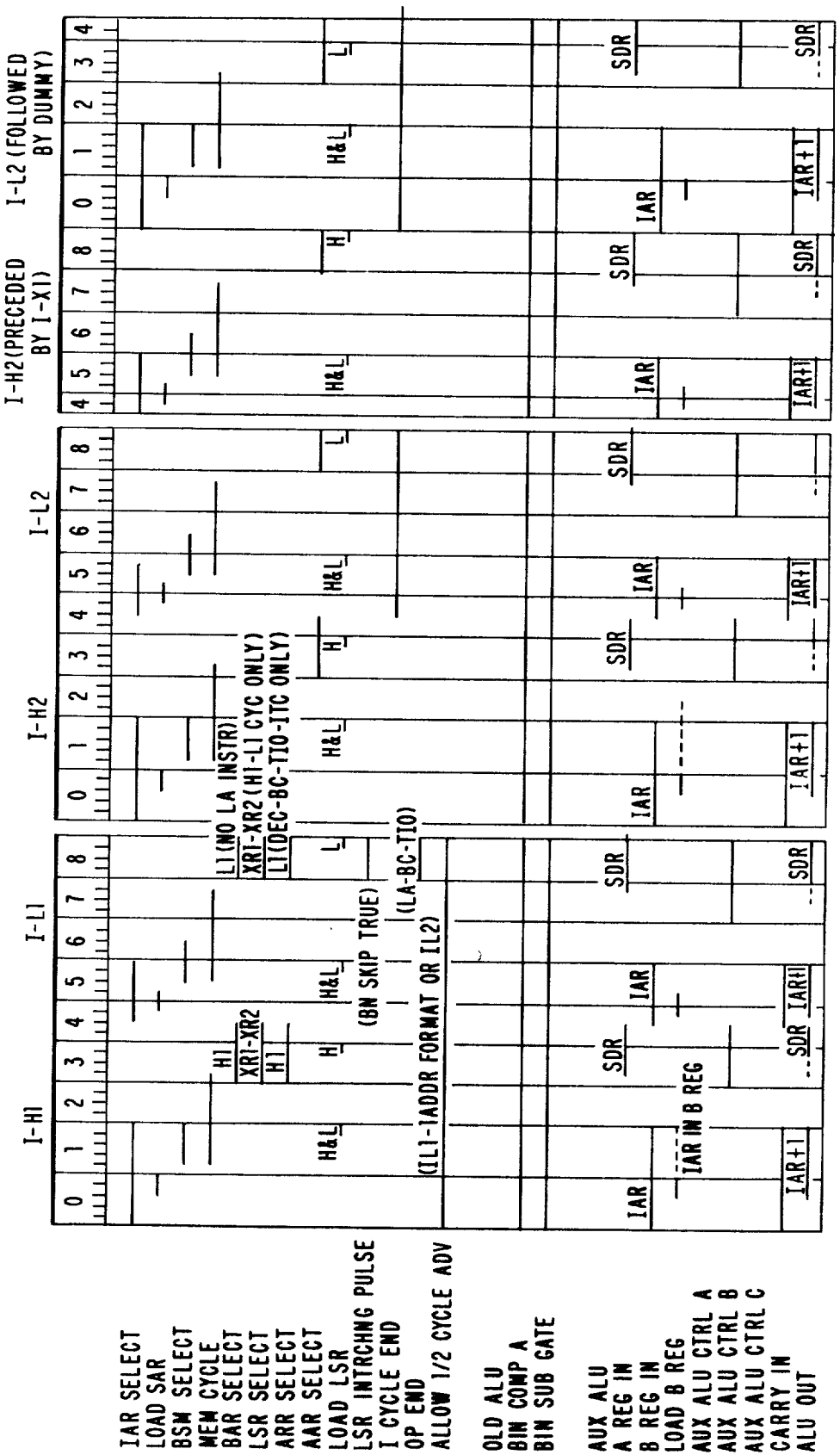
FIG. 9 is a timing diagram illustrating the I-H and I-L cycles for different types of instruction, and, FIG. 10 is a timing diagram illustrating the I-X cycles for different types of instructions.
Figure 10:
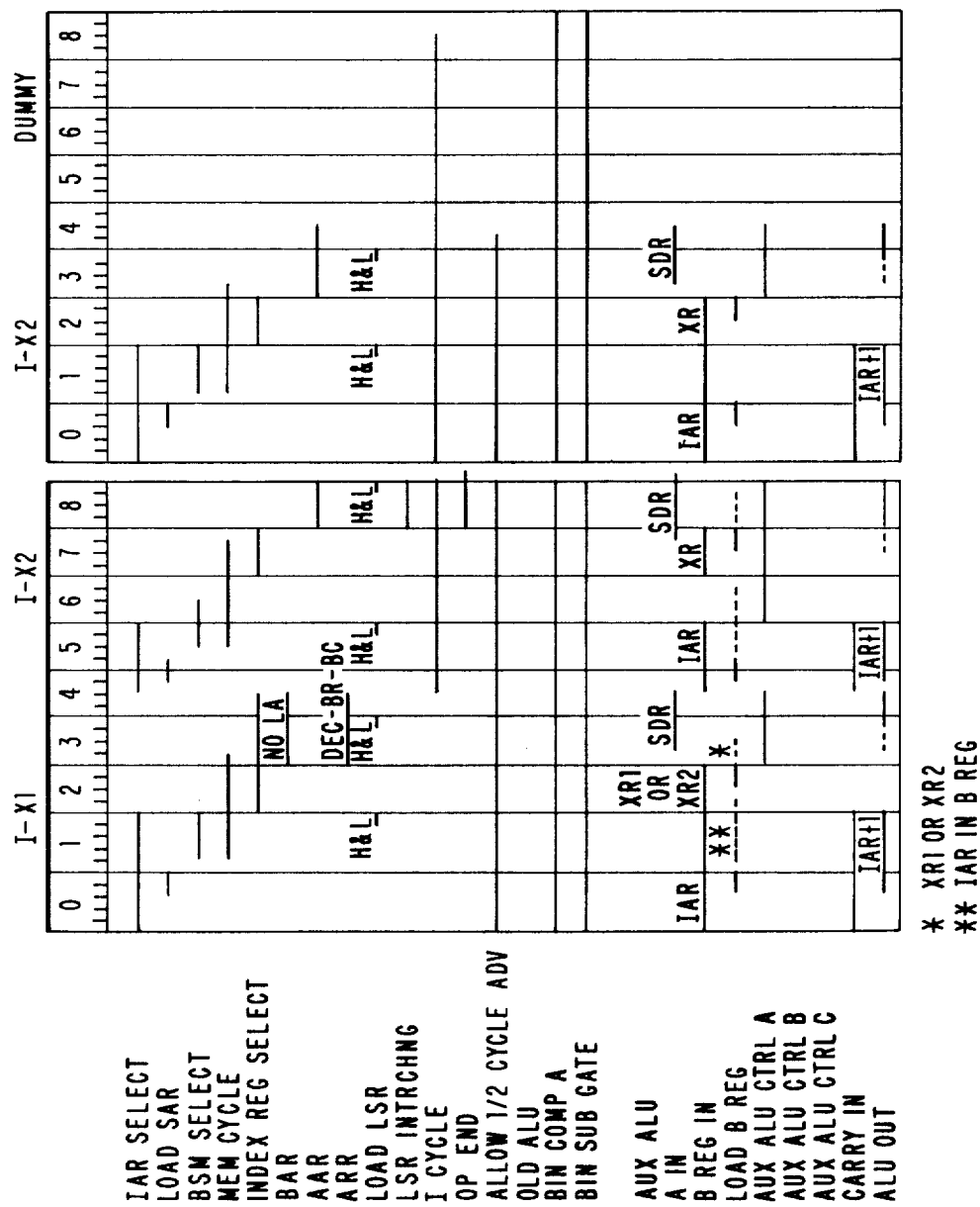

A dummy half cycle will also occur after an I-X1 cycle for an instruction having one address. This is accomplished by means of AND circuit 127 which also feeds OR circuit 130. The origin of the signals applied to AND circuit 127 is set forth on page 2-37 of manual SY31-0367-2. A dummy half cycle also follows an I-X2 or I-L2 cycle of an instruction having two addresses, see FIGS. 9 and 10. This condition is detected by AND circuit 129. The origin of the signals applied to AND circuit 129 is shown on page 2-37 of manual SY31-0367-2.

Dummy half cycles also occur for program checks, machine cycle step, and for diagnostic mode. The origin of the program signal is shown on page 2-42 of manual SY31-0367-2. The machine cycle step signal comes from a manually operated switch located on the computer system console (see page 7-7 of manual SY31-0367-2).

A dummy half cycle occurs when in the diagnostic mode after any of the I cycles which generate the fast I cycle signal. The diagnostic mode signal comes from latch 125 which has its set input connected to AND circuit 123 and its reset input connected to AND circuit 124. AND circuit 123 receives an input from AND circuit 121, an IR cycle input and an input from inverter 122. AND circuit 121 receives a Command CPU Instruction signal and bit one of the Q byte. Inverter 122 receives a signal from bit 6 of ALU 50. The origin of the IR cycle signal is shown on page 2-2 of manual SY31-0367-2. AND circuit 124 for resetting latch 125 has an input from AND circuit 121 and it receives the IR cycle signal and the ALU bit 6 input.

The output of OR circuit 136 for providing the fast I cycle signal is also applied to an input of AND circuit 137. AND circuit 137 also receives an input from OR circuit 130 via inverter 135 and receives a clock 4 input. The output of AND circuit 137 is an Allow Half Cycle OPS signal.

Figure 2C:
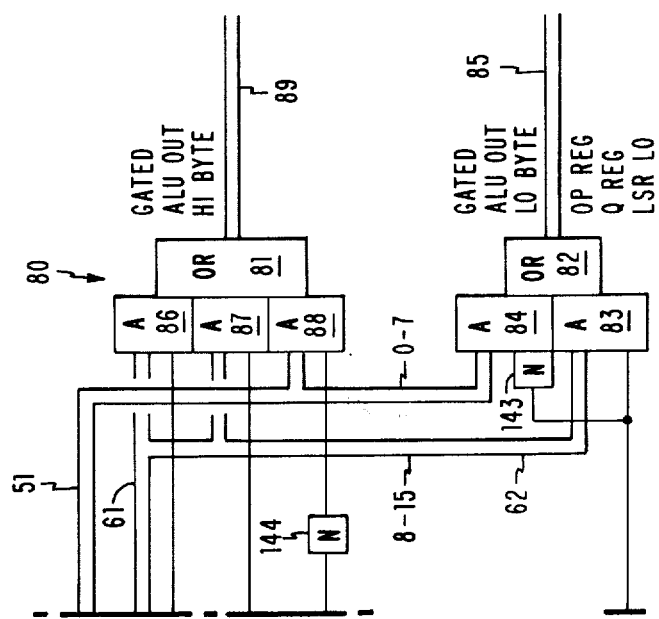
Figure 1A:
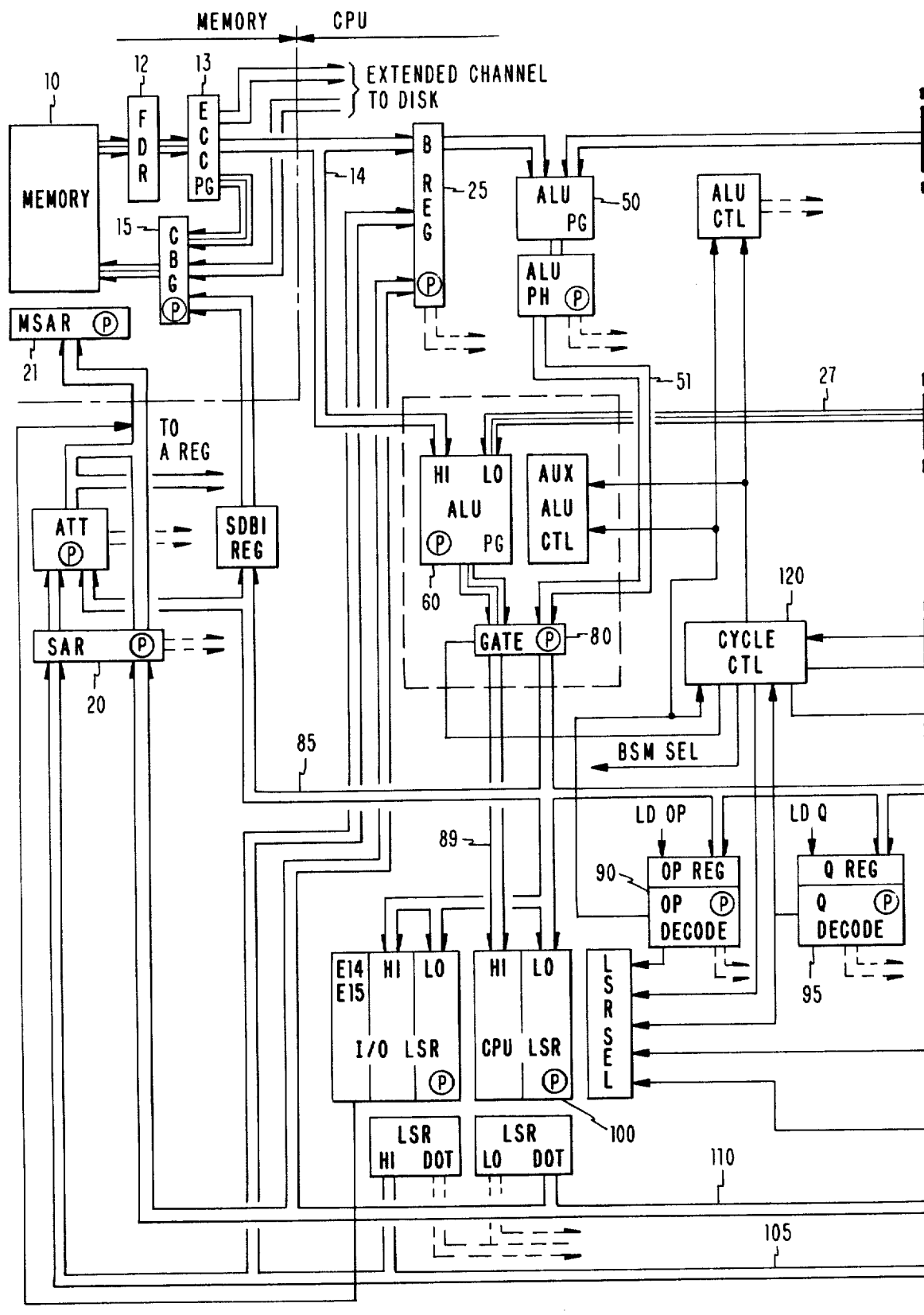
Figure 1B:
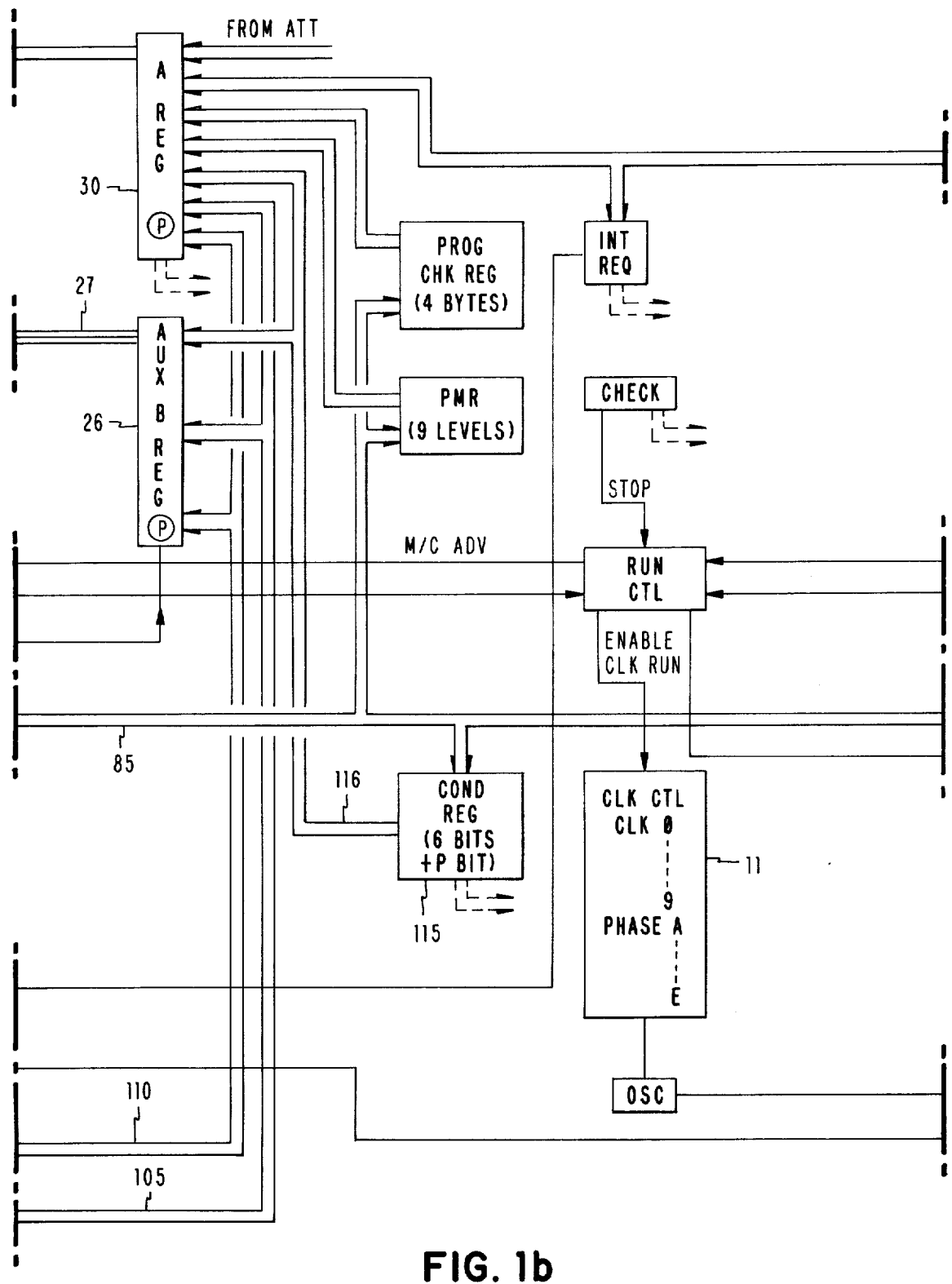
Figure 1C:
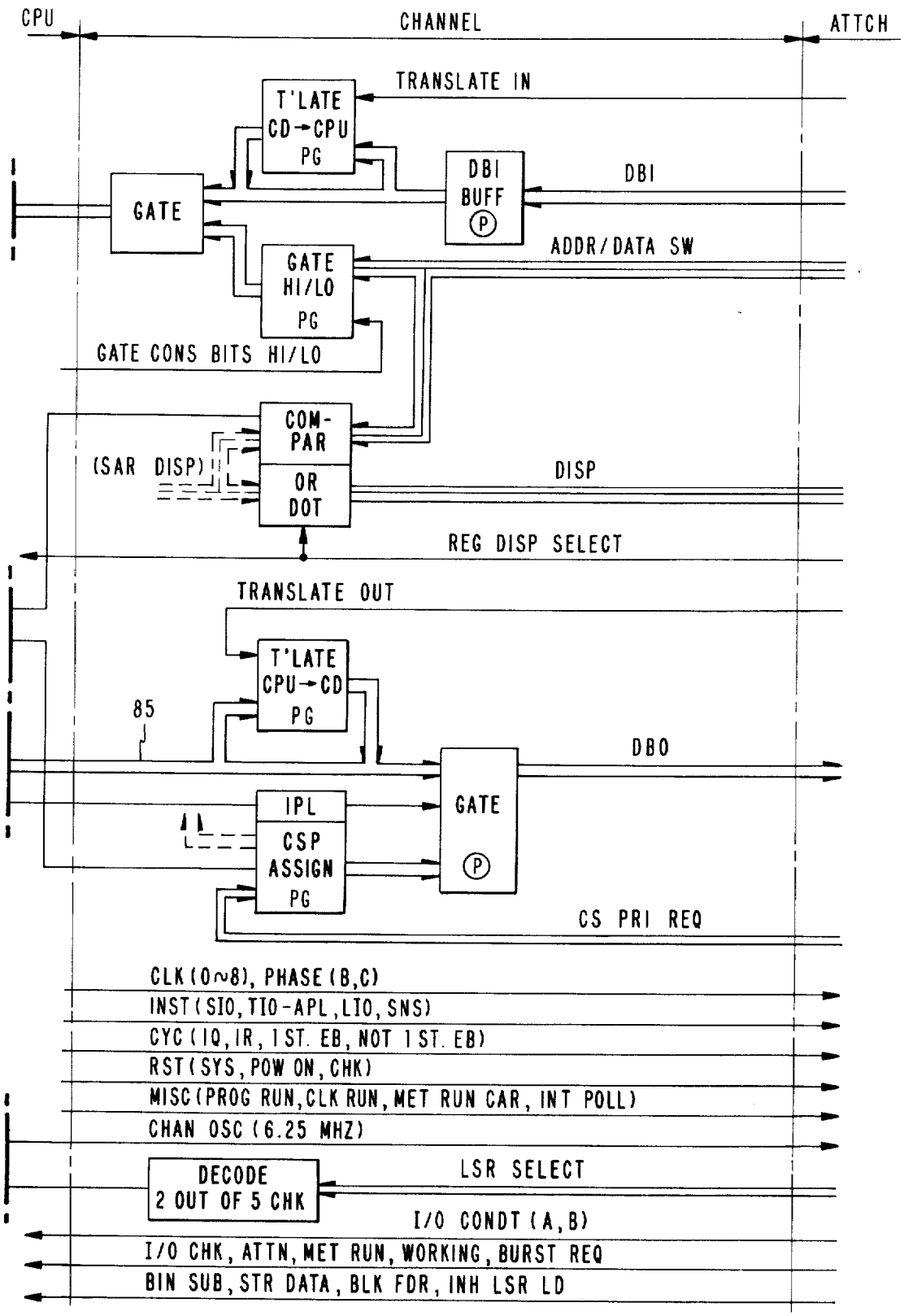
Figure 2A:
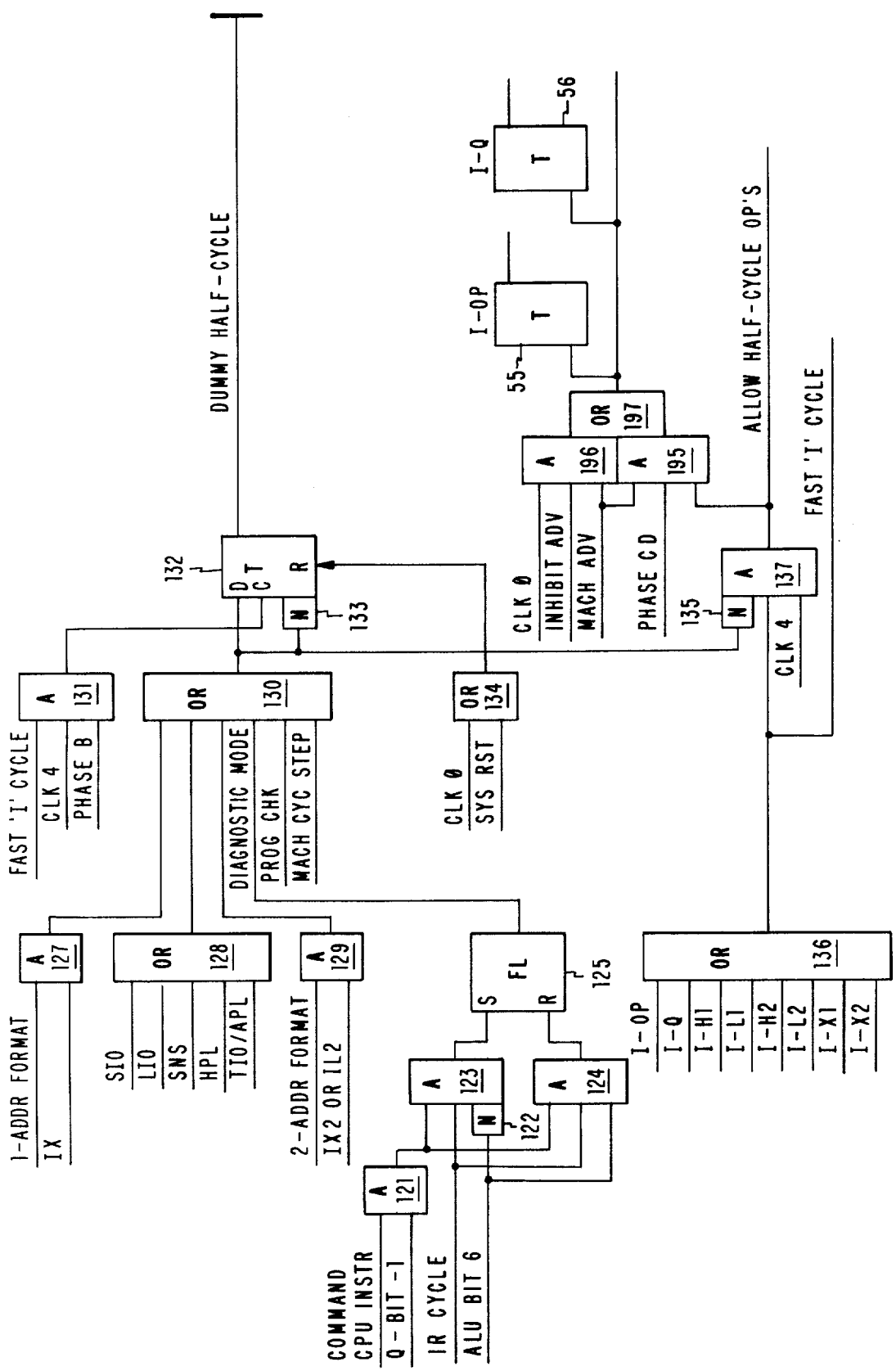
Figure 2B:
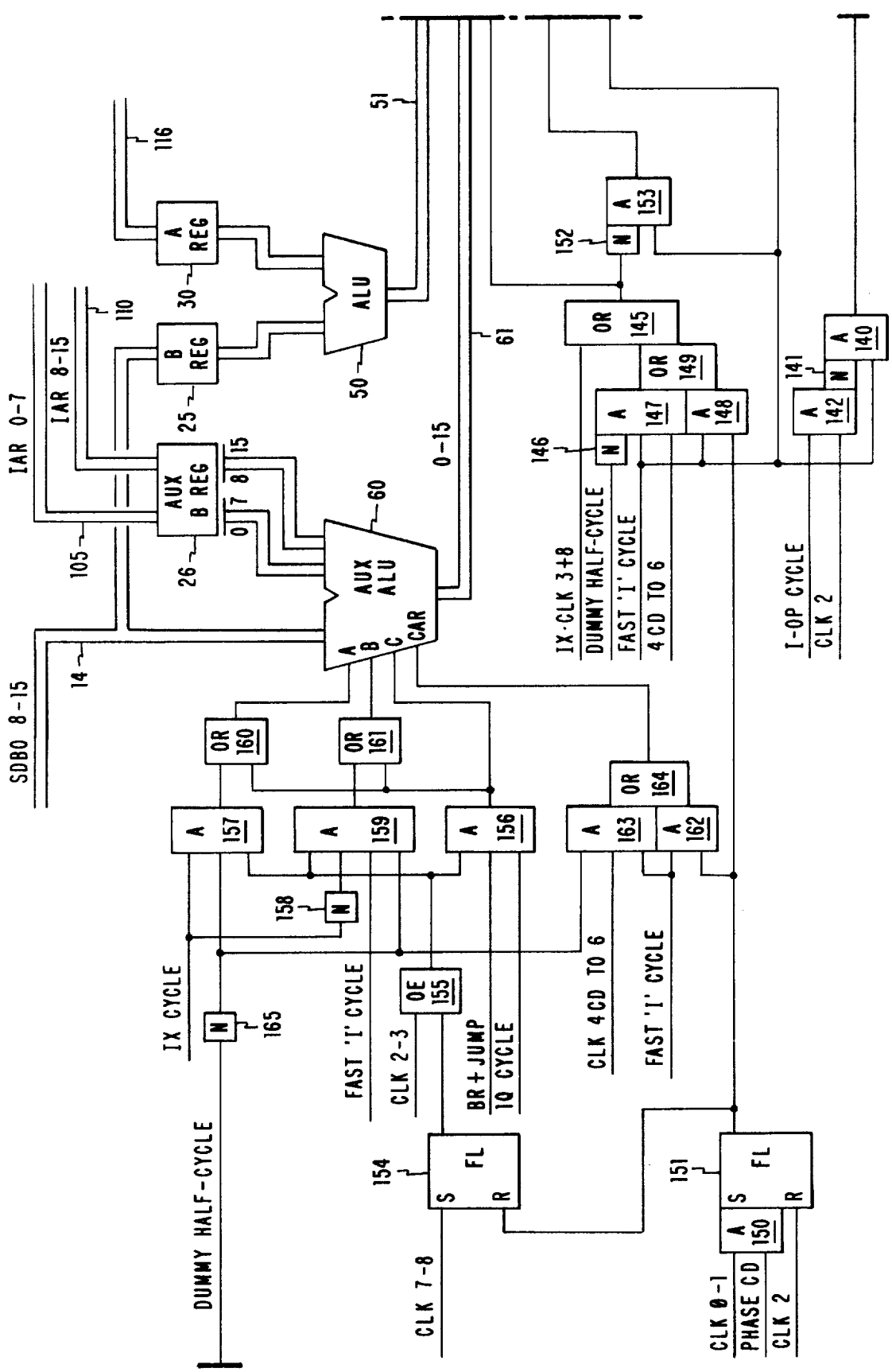

FIGS. 2b and 2c show the details of gate 80 and the controls thereof. Gate 80 includes OR circuits 81 and 82 for passing high and low bytes respectively. The output of OR circuit 82 is bus 85 and as previously mentioned it feeds OP register 90, Q register 95, and the low byte input of the LSR's 100. OR circuit 82 has inputs from AND circuits 83 and 84. AND circuit 83 controls the high speed path from auxiliary ALU 60. Bits 8-15 on bus 61 are split off via bus 62 and applied to AND circuit 83. AND circuit 83 is conditioned by a signal from AND circuit 140 which receives the fast I cycle signal from OR circuit 136 and also receives an input from inverter 141. Inverter 141 is fed by AND circuit 142 which receives the I-OP cycle signal and a clock 2 signal. Thus, AND circuit 140 will be satisfied during fast I cycle when in the I-OP cycle at a clock time other than clock 2 time.

Referring again to FIG. 8 as well as FIG. 2b it is seen that the OP code byte on bus 14 can be entered into the OP register via ALU 60, bus 61, bus 62, AND circuit 83, OR circuit 82 and bus 85 during clock 3 time. It was also previously mentioned that the condition register 115 is loaded into an LSR 100 during clock 2 time. The contents of the condition register 115 are loaded into a selected LSR by first entering A register 30 via bus 116. The condition register contents then pass from A register 30 into ALU 50 and out of ALU 50 via bus 51 to AND circuit 84. AND circuit 84 is conditioned by the output of inverter 143 which is fed by AND circuit 140. Therefore, since AND circuit 140 is not conditioned during clock 2 time during fast I cycle and I-OP cycle, inverter 143 will condition AND circuit 84 to pass the condition register contents via OR circuit 82 and over bus 85 to the low byte of the selected LSR 100.

Although the output of ALU 50 is also applied to AND circuit 88, this AND circuit is not conditioned during fast I cycle because of inverter 144. Thus, gate 88 is primarily used to pass the byte from ALU 50 during execute cycles of an instruction and during I/O instructions.

AND circuit 86 controls the passage of the high byte from auxiliary ALU 60. AND circuit 86 is essentially conditioned anytime there are two bytes passed from auxiliary ALU 60. Two bytes are passed from auxiliary ALU 60 when the IAR is being updated and during an index cycle. An index cycle is used for adding a one byte displacement to an index register to form a new storage address. The index register is one of the LSR registers 100. AND circuit 86 is conditioned during an index cycle by an I-X signal during clock 3 or 8 time via OR circuit 145. OR circuit 145 also receives a signal from OR circuit 149 which has an output when the IAR is to be updated. It will be recalled that the IAR is updated during clock 0-1 time and during clock 4CD to clock 6 time. Latch 151 is set during clock 0-1 time under control of AND circuit 150. AND circuit 150 receives the clock 0-1 time and a phase CD signal. The output of latch 151 is applied to AND circuit 148 which also receives the fast I cycle signal. Latch 151 is reset under control of a clock 2 signal. AND circuit 147 controls the conditioning of AND circuit 86 when in the fast I cycle, but not in a dummy half cycle. Thus, AND circuit 147 receives the fast I cycle signal and has an input from inverter 146 which receives the dummy half cycle signal. AND circuit 147 receives a timing signal 4CD to clock 6 time.

Gate 87 controls the passage of the low byte from auxiliary ALU 60 during I-H1 and I-H2 cycles. The I-H1 and I-H2 cycles are for passing the high bytes of operand addresses one and two from storage to selected LSR's 100. Gate 87 is controlled by AND circuit 153 which receives the fast I cycle signal and the output of inverter 152. Inverter 152 is fed by OR circuit 145.

The incrementing of the contents of the IAR by auxiliary ALU 60 is accomplished under control of AND circuit 156 and OR circuits 160, 161, and 164. Auxiliary ALU 60 has function control inputs A, B, C, and carry. The auxiliary ALU 60 will perform an increment by one operation by forcing a carry and providing zero inputs to A, B, and C. The carry is forced via OR circuit 164 under control of AND circuits 162 and 163.

AND circuit 162 receives the fast I cycle signal and the output of latch 151. Hence, a carry will be forced into auxiliary ALU 60 for incrementing the IAR during phase C and D of clock 0-1 time. AND circuit 163 also receives the fast I cycle signal and receives a clock 4C to 6 timing signal and an output from inverter 165 which receives the dummy half cycle signal. Thus, AND circuit 163 controls the forcing of the carry into auxiliary ALU 60 for updating the IAR during clock 4CD to 6 time. AND circuit 156 is not active at this time because it receives an input from exclusive OR circuit 155 which has a clock 2-3 input and an input from latch 154. Latch 154 is set by a clock 7-8 timing signal and is reset by the output of latch 151. The other inputs into AND circuit 156 include a branch or jump signal and an I-Q cycle signal.

It should be noted that the output of AND circuit 156 also feeds OR circuit 161. The other input into OR circuit 161 comes from AND circuit 159 which receives the fast I cycle signal and signals from exclusive OR circuit 155, and inverters 158 and 165. Inverter 158 is fed by an I-X cycle signal. Since AND circuit 159 is fed by exclusive OR circuit 155, it will not be providing an output for the B control input of auxiliary ALU 60 at this time. OR circuit 160 is fed by AND circuits 156 and 157. AND circuit 157 receives the I-X cycle signal and outputs of exclusive OR circuit 155 and inverter 165.

Thus, AND circuit 157 will not be providing a signal to OR circuit 160 for activating the A control input of auxiliary ALU 60 at this time.

It should be noted that auxiliary ALU 60 passes the data from bus 14 directly to its output bus 61 when the B control input is receiving a signal and there are no signals present at the A, C, or carry inputs. AND circuit 159 must and will be active to pass the data on bus 14 directly through the auxiliary ALU 60 to bus 61 when not in a dummy half cycle and not during an I-X cycle.

In order to increment the contents of the IAR it is necessary to transfer them into auxiliary B register 26. Auxiliary B register 26 is loaded under control of OR circuit 175, see FIG. 3. LSR HI bus 105 feeds AND circuit 176 which is representative of a group of AND circuits; one for each bit of the bus. The output of AND circuit 176 feeds AND circuit 178 which is conditioned by the output of OR circuit 175. AND circuit 176 is conditioned by inverter 177 which is fed by AND circuit 173. The LSR LO bus 110 is shown as feeding into AND circuits 179, there being one AND circuit for each bit of the bus. These AND circuits are also conditioned by the output of inverter 177 and feed AND circuits 180. AND circuits 180 are controlled by the output of OR circuit 175. It should be noted that bits 2 and 7 from the condition register can also enter the auxiliary B register 26 via AND circuits 179 and OR circuits 183 and 184.

OR circuit 175 receives a Load SAR signal from OR circuit 188 which is fed by AND circuits 186 and 187. Thus, the load SAR signal is used for loading the auxiliary B register 26 as well as SAR 20. AND circuit 186 receives the Allow Half Cycle OPS from AND circuit 137, FIG. 2a, and a clock 4D-5A timing signal. AND circuit 187 receives a clock 0 signal and a phase DE signal. Thus, register 26 can be loaded during half cycle operations under certain timing conditions. Register 26 can also be loaded under control of AND circuit 171 which receives an I-X Cycle Internal signal, a Phase CD Pwd A signal and a signal from OR circuit 170. OR circuit 170 receives clock 2 and clock 7 to Channel signals. The other input into OR circuit 175 is from AND circuit 174. AND circuit 174 receives the Phase CD Pwd A signal and an output from AND circuit 173. AND circuit 173 receives the NOT dummy cycle signal, an I-Q Cycle Pwd signal, a branch or jump signal, and a signal from OR circuit 172. OR circuit 172 receives clock 2 and clock 6 signals.

The Allow Half Cycle OPS signal from AND circuit 137, FIG. 2a, is also used for controlling the I-OP and I-Q triggers 55 and 56 via AND circuit 195 and OR circuit 197. The normal path for controlling triggers 55 and 56 is via AND circuit 196 and OR circuit 197. AND circuit 195 receives the Machine Advance signal and a phase CD signal as well as the Allow Half Cycle OPS signal. AND circuit 196 receives a clock 0 signal, an Inhibit Advance signal and a Machine Advance signal.

Figure 3A:
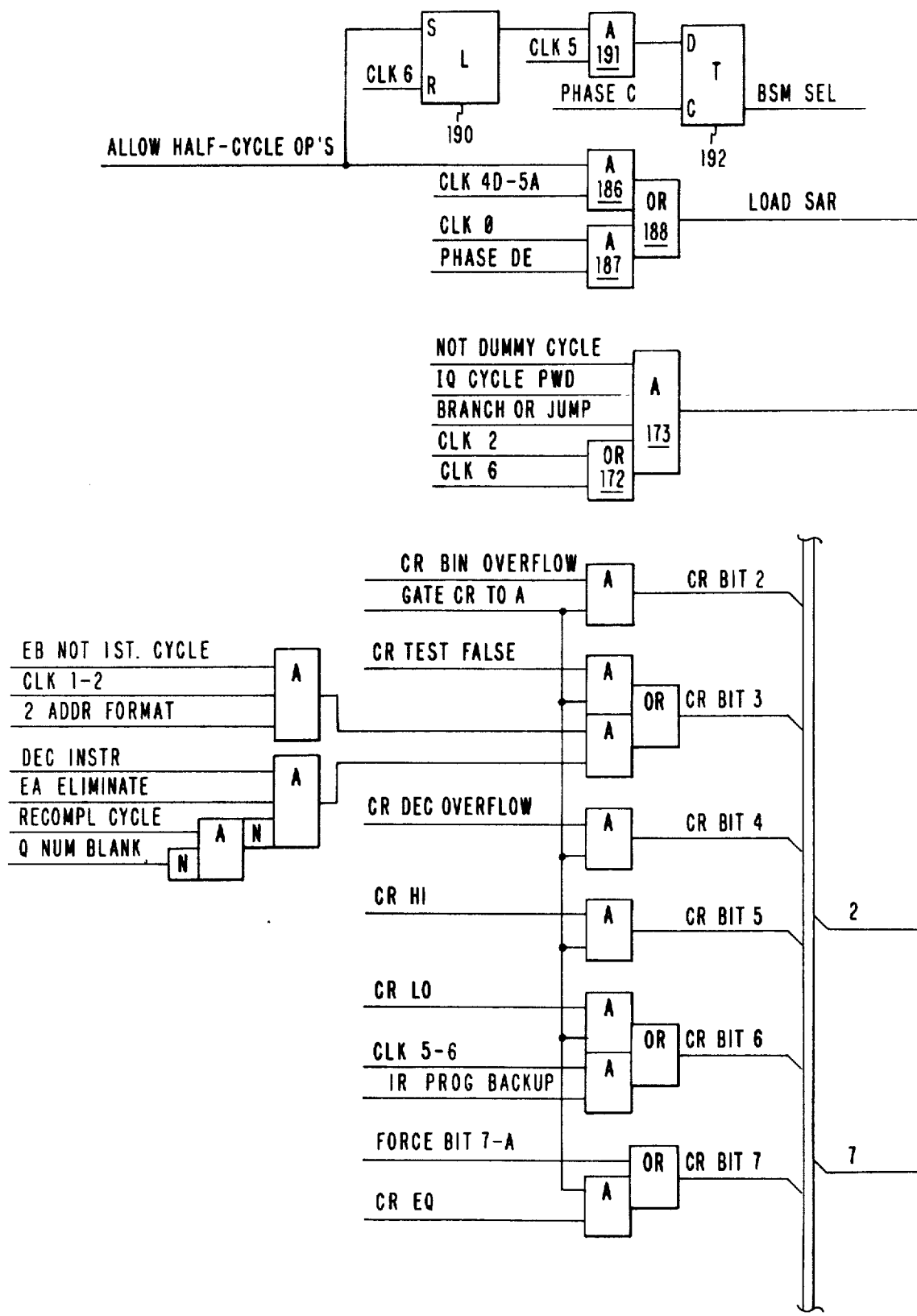
FIGS. 3a and 3b with FIG. 3a disposed to the left of FIG. 3b taken together are a schematic logic diagram of the logic circuitry for controlling entry of data into the auxiliary B register.
Figure 3B:
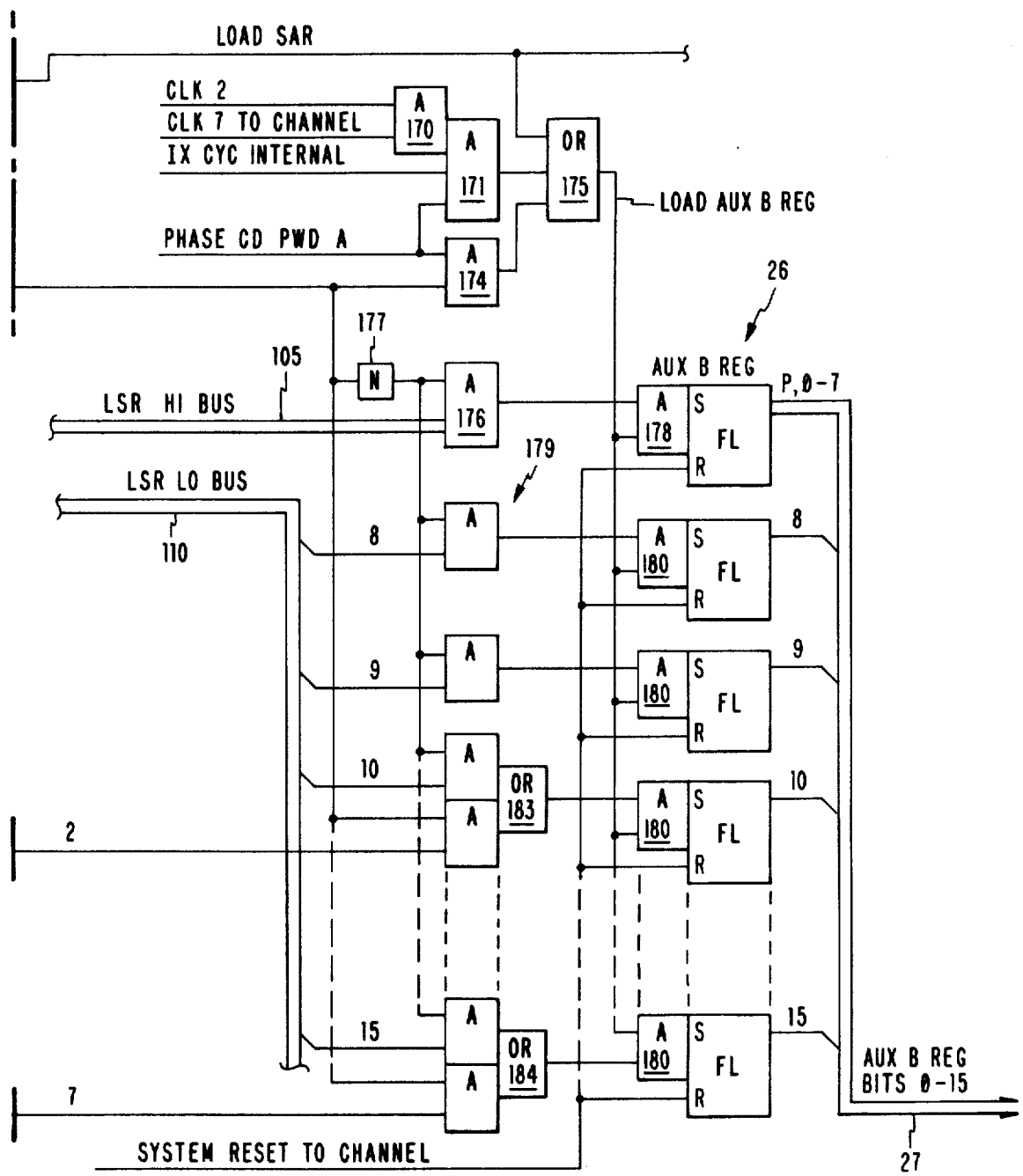
Figure 4A:
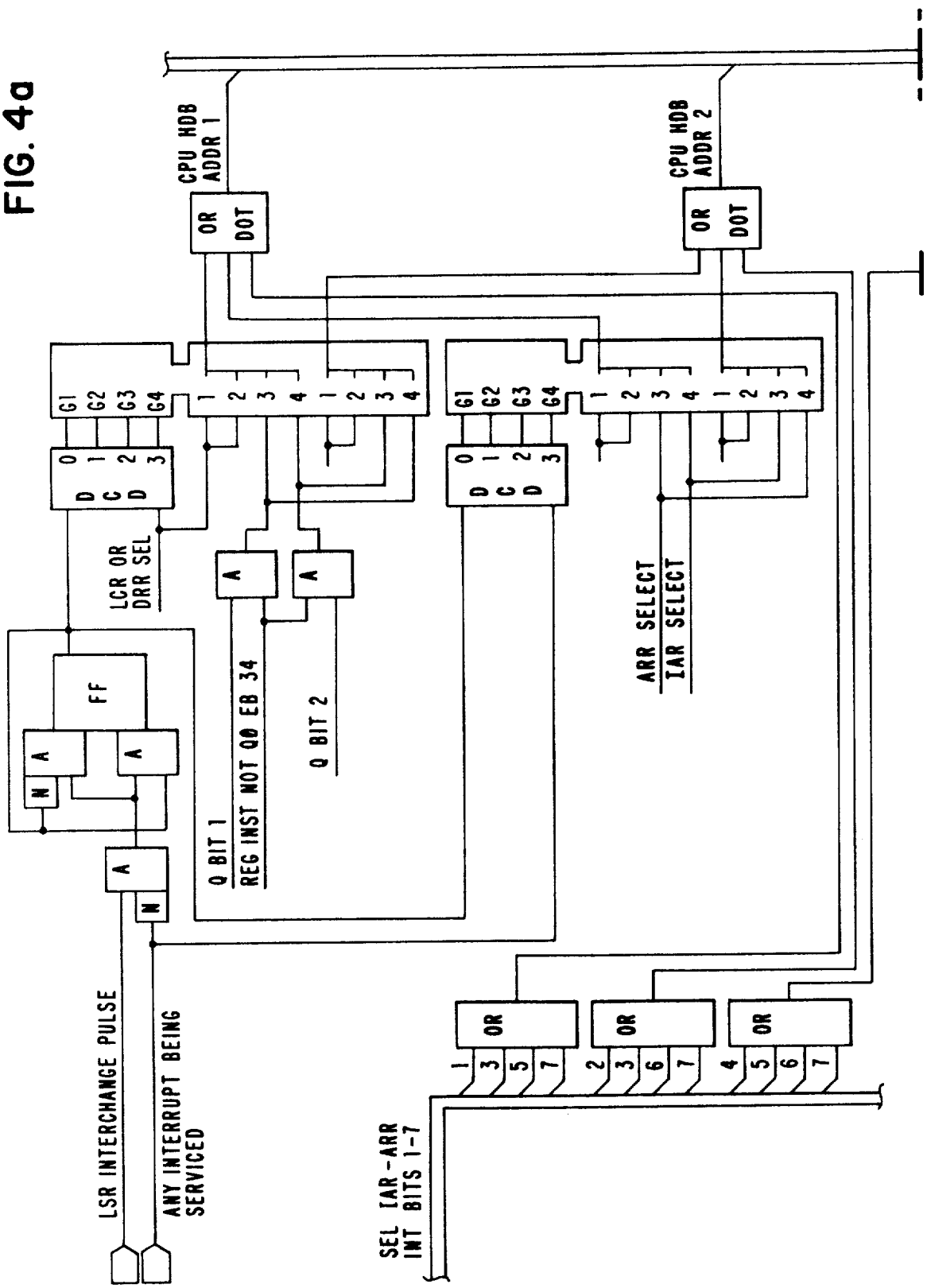
Figure 4C:
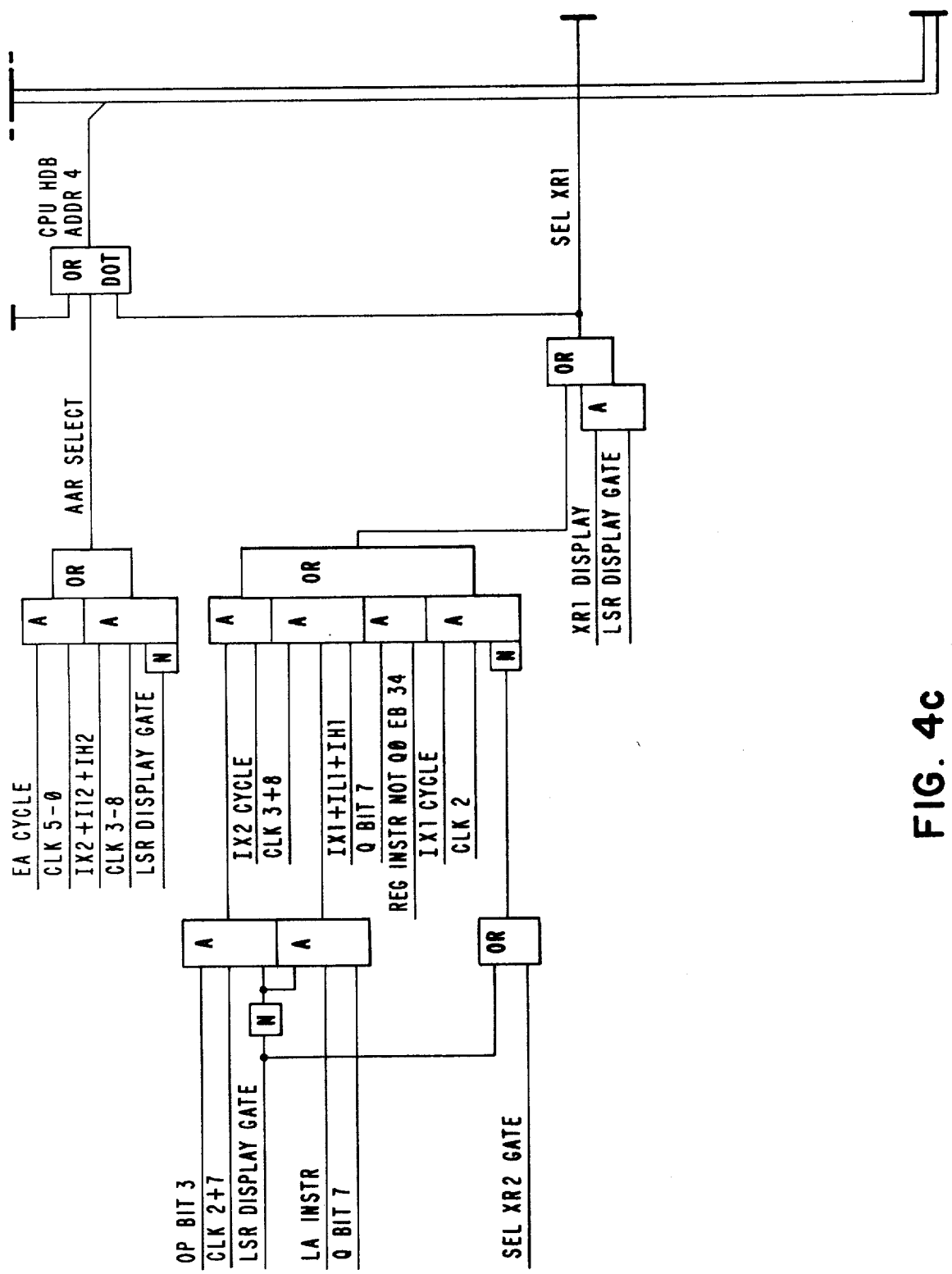
Figure 4D:
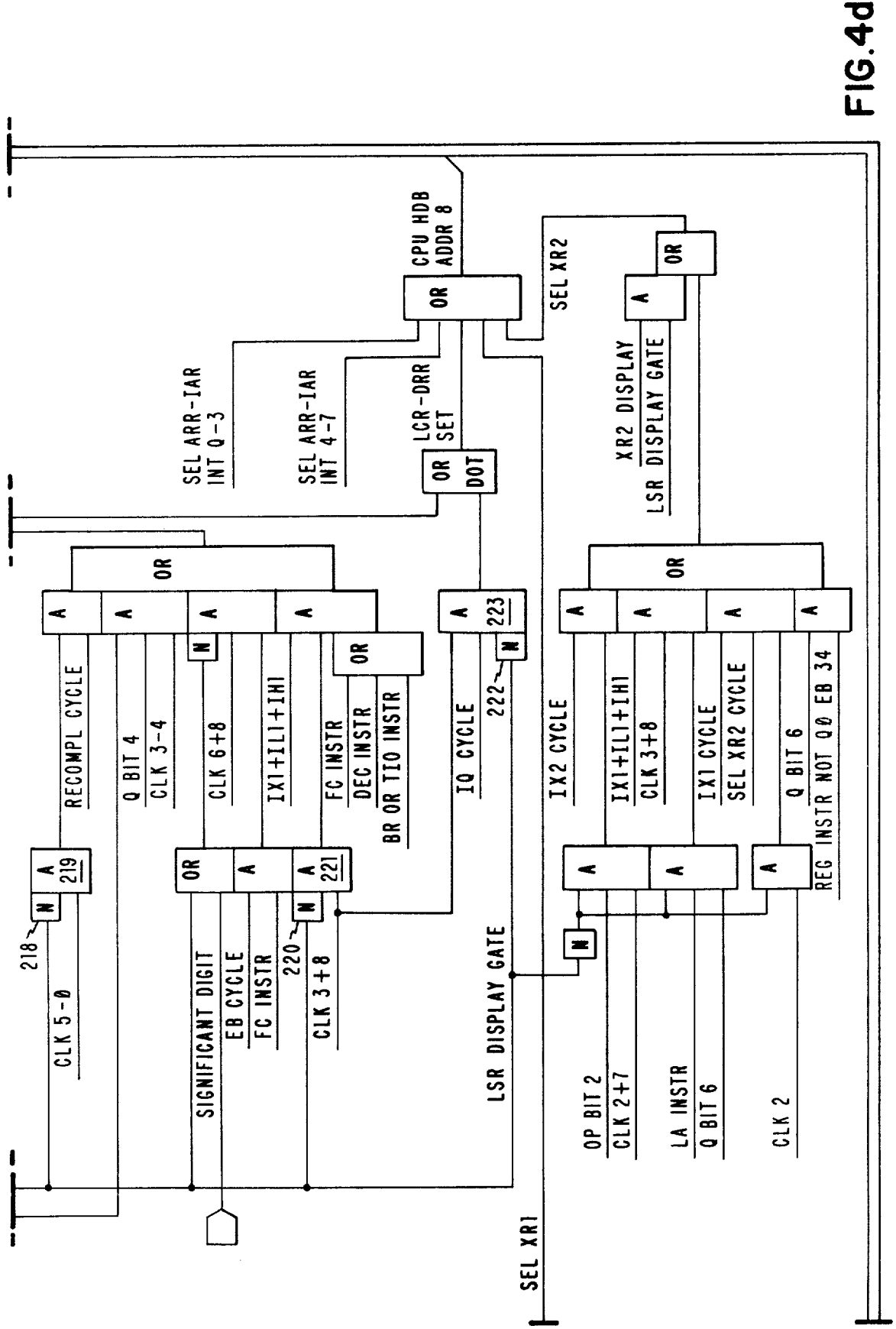

The Allow Half Cycle OPS signal is also used for controlling the setting of latch 190, FIG 3. The output of latch 190 is applied to AND circuit 191 which also receives a clock 5 signal. AND circuit 191 feeds the data input of trigger 192 which receives a phase C signal at its clock input. The output signal from trigger 192 is a BSM SEL signal for activating main storage 10.

Figure 4:
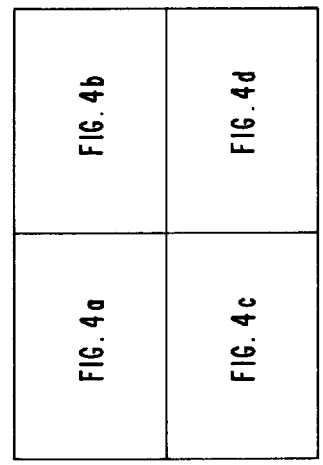
FIG. 4 is a block diagram illustrating the arrangement of FIGS. 4a, 4b, 4c, and 4d which taken together are a logic circuit diagram of the CPU LSR address circuitry.

As previously mentioned, no CPU or main storage activity takes place during a dummy half cycle. Thus, the dummy half cycle signal from trigger 132 is applied to OR circuit 202 FIG. 4b. The output of OR circuit 202 is used for inhibiting AND circuit 205 via OR circuit 203 and inverter 204. The output of OR circuit 202 also inhibits AND circuits 207, 208, 209 and 210 via inverter 206. OR circuit 202 uses inverter 215 for inhibiting AND circuits 216 and 217. Or circuit 202 inhibits AND circuits 219, 221, and 223 via inverters 218, 220, and 222, respectively. The logic circuitry just described is for normally addressing the CPU LSR's of LSR's 100.

Figure 5:
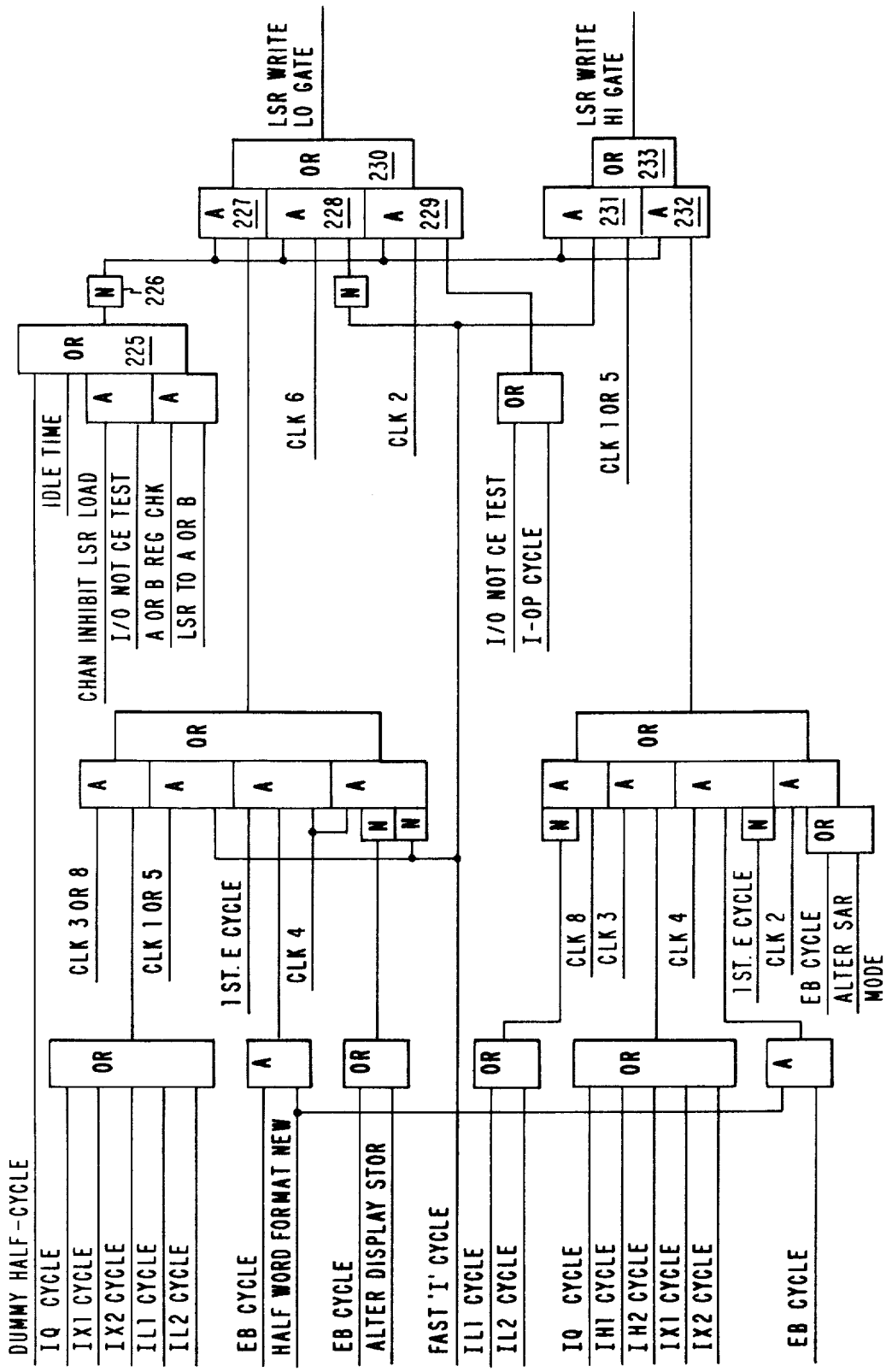
FIG. 5 is a logic circuit diagram of the LSR WRITE GATE circuitry.
Figure 7:
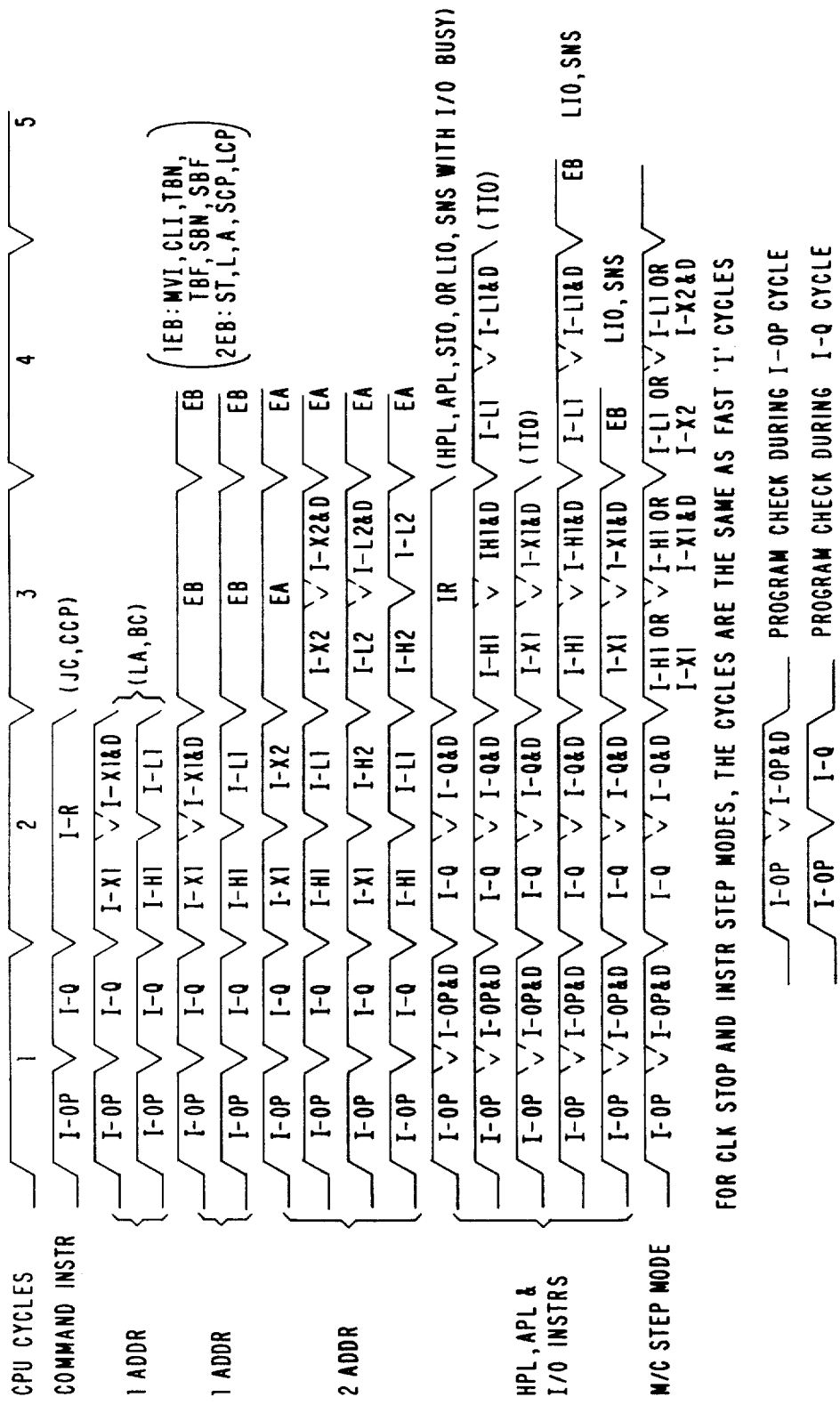
FIG. 7 is a timing diagram showing the instruction cycles required to fetch the different types of instructions.

The dummy half cycle signal is also used to inhibit LSR Write LO Gate and LSR Write HI Gate signals. The dummy half cycle signal is applied to OR circuit 225, FIG. 5 and its output is applied to inverter 226. The output of inverter 226 is applied to AND circuits 227, 228, and 229 which feed OR circuit 230 and to AND circuits 231 and 232 which feed OR circuit 233. The LSR Write LO Gate and LSR Write HI Gate signals are taken from OR circuits 230 and 233 respectively.

From the foregoing it is seen that the invention provides fast and normal rate I cycles depending upon the type of instruction being fetched. The fast rate I cycles improve the rate of instruction processing without a significant change in the hardware of the computer system which is responsive to the instructions processed at the fast rate. On the other hand, hardware such as the controls for I/O devices which would require extensive changes to take advantage of the faster instruction rate, can be operated without any change by processing the associated instructions at the normal rate. The normal rate is achieved by use of dummy I cycles or machine half cycles.

What is claimed is:

1. In a computer system having fixed length machine cycles and where instructions consisting of a plurality of segments are fetched from storage in a timed relationship to said fixed length machine cycles by fetching segments of an instruction successively to completely fetch an instruction, said instruction including first and second predetermined types of instructions, the improvement comprising:
    means for fetching a first segment of an instruction during a first portion of said fixed length machine cycle to enable determination of the type of instruction being fetched,
    instruction analyzing means for analyzing said first segment and generating one type of signal when the type of instruction being fetched is analyzed as being said first predetermined type of instruction and generating another type of signal when the type of instruction being fetched is analyzed as being said second predetermined type of instruction, and
    means responsive to said instruction analyzing means generating said one type of signal for fetching at least another segment of said instruction during the same fixed length machine cycle that was used for fetching said first segment.

2. The computer system of claim 1 wherein said first predetermined type of instruction is a one address direct instruction defined by a first segment and having at least a second segment containing encoded bits for representing a location in said storage.

3. The computer system of claim 1 wherein said first predetermined type of instruction is a one address indexed instruction defined by a first segment and having at least a second segment containing encoded bits for representing an address indexing value.

4. The computer system of claim 1 wherein said first predetermined type of instruction is a two address direct instruction defined by a first segment and having at least second and third segments each containing encoded bits for representing individual locations in said storage.

5. The computer system of claim 1 wherein said first predetermined type of instruction is a two address instruction with one address direct and one address indexed defined by a first segment and having at least a second segment containing encoded bits for representing a location in said storage and a third segment containing encoded bits for representing an indexing value.

6. The computer system of claim 1 wherein said first predetermined type of instruction is a two address indexed instruction defined by a first segment and having at least second and third segments each containing encoded bits for representing individual locations in said storage and a fourth segment containing encoded bits for representing an indexing value.

7. In a computer system having an addressable storage for storing instructions consisting of segments where each segment is stored at an addressable location, and a central processing unit including timing means for providing timing signals defining fixed length machine cycles, and addressing means connected under control of said timing means and to said storage for addressing said storage to fetch a segment of an instruction whereby an instruction is fetched by successive fetches of segments, the improvement comprising:
    means within said timing means for causing said addressing means to address said storage during a first portion of said fixed length machine cycle so as to fetch a first segment of an instruction,
    means responsive to a timing signal from said timing means for providing address modification signals to said addressing means for modifying the storage address of the segment being fetched during said first portion of a machine cycle,
    instruction analyzing means connected to said storage and under control of said timing means for receiving said first segment of an instruction for analyzation thereof during said first portion of said fixed length machine cycle and including means for generating a signal as a result of said analyzation indicating the type of instruction being fetched, and
    means for providing a signal to said timing means in response to said instruction analyzing means generating a signal indicating a first predetermined type of instruction for causing said addressing means to address said storage during a second portion of said fixed length machine cycle during which said instruction analyzing means received said first segment of an instruction.

8. In a stored program computer system having storage for storing instructions consisting of segments, said instructions being of first and second types, means for fetching instructions segment by segment during fixed length machine cycles, each instruction requiring at least two instruction segment fetches to completely fetch an instruction, the improvement comprising:
    means for providing signals to said means for fetching instructions to inititate an instruction segment fetch at the beginning of said fixed length machine cycle,
    indicating means connected to receive said instruction segment fetched at the beginning of said machine cycle for generating a signal indicating the type of instruction being fetched as a result of analyzing the segment fetched, and means for controlling signals to said means for fetching instructions to initiate an additional instruction segment fetch within said fixed length machine cycle having said instruction segment fetch at the beginning thereof in response to said signal generated by said indicating means indicating that the instruction being fetched is said first predetermined type.

9. In a computer system having fixed length machine cycles, an addressable storage for storing instructions, each instruction consisting of segments with each segment stored at an addressable location, said instructions including first and second predetermined types of instructions, addressing means connected for addressing said storage, storage control means connected for controlling reading from and writing into said storage during said machine cycles, an address source connected to provide addresses to said addressing means, instruction analyzing means connected to receive first segments of instructions read from storage for generating signals which indicate the type of instruction being fetched, timing means for providing timing signals defining said fixed length machine cycles and connected to provide said timing signals to said storage control means, to said address source, to said instruction analyzing means, the improvement comprising:

means for modifying addresses from said address source while said storage control means is controlling reading of first segments of instructions out of storage to provide modified addresses to said addressing means, and means responsive to signals from said analyzing means indicating first predetermined types of instructions for providing signals to said storage control means to cause reading from said storage whereby two instruction segments are read from said storage within a single fixed length machine cycle for said first predetermined types of instructions.

10. In a computer system having fixed length machine cycles and where instructions consisting of a plurality of segments are fetched from storage in a timed relationship to said fixed length machine cycles by fetching segments of an instruction successively to completely fetch an instruction, said instructions including first and second predetermined types of instructions, the improvement comprising:

instruction fetching means for fetching segments of instructions and initially operable to fetch a first segment of an instruction during a first portion of said fixed length machine cycle and operable to fetch a second segment of an instruction during the same fixed length machine cycle for fetching said first segment upon receiving a signal indicating that the instruction being fetched is not said second type of instruction and rendered inoperable to fetch a second segment of an instruction during the same fixed length machine cycle for fetching said first segment upon receiving a signal indicating that the instruction being fetched is said second type of instruction, instruction analyzing means for analyzing said first segment of an instruction and generating one type of signal indicating that the type of instruction being fetched is not said second predetermined type of instruction and generating another type of signal indicating that the instructio being fetched is said second predetermined instruction, and means for applying said one and another types of signals to said instruction fetching means.

11. In a computer system having fixed length machine cycles, an addressable storage for storing instructions, each instruction consisting of segments with each segment stored at an addressable location, said instructions including first and second predetermined types of instructions, addressing means connected for addressing said storage, storage control means connected for controlling reading from and writing into said storage during said fixed length meache cycles, an address source connected to provide addresses to said addressing means, instruction analyzing means connected to receive first segments of instructions read from storage and generate signals indicating that the instruction being fetched is not said second predetermined type of instruction, timing means for providing timing signals defining said fixed length machine cycles and connected to provide said timing signals to said storage control means, to said address source, to said instruction analyzing means, the improvement comprising:

means for modifying addresses from said address source while said storage control means is controlling reading of said first segments from storage and providing modified addresses to said addressing means, and means responsive to signals from said analyzing means indicating that the instructions being fetched are not said second predetermined type of instruction for providing signals to said storage control means to cause additional reading of said storage during the same fixed length machine cycles for fetching said first segments whereby two instruction segments are read from said storage within a single machine cycle for said first predetermined types of instructions.

* * * * *